Patented Feb. 23, 1943

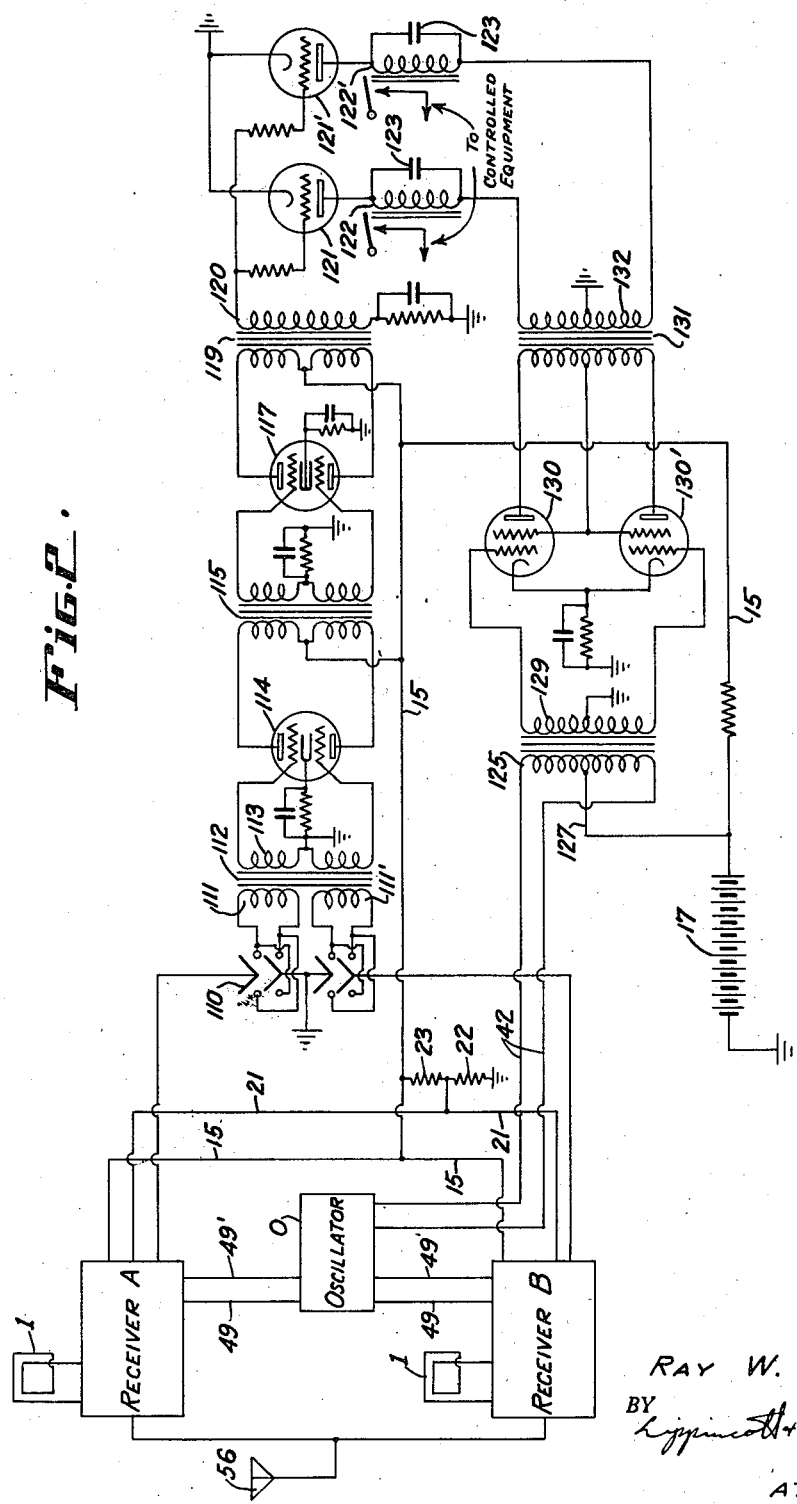

2,312,247

UNITED STATES PATENT OFFICE 2,312,247

AUTOMATIC RADIO CONTROL DEVICE

Ray W. Gudie, Los Angeles, Calif., assignor to Leo M. Harvey, La Canada, Calif.

Application January 18, 1941, Serial No. 375,006

4 Claims. (Cl. 250—11)

This invention relates to automatic radio navigational equipment, and particularly to equipment wherein comparison must be made between some characteristic, other than the relative amplitudes, of two radio signals whose strength at the point of reception differs. Examples of such devices are radio pilots or automatic steering controls such as those disclosed by Goble and Phillips in copending application, Serial No. 314,854, filed January 20, 1940, Patent No. 2,247,294 granted June 24, 1941, blind landing systems such as that of Goble, Phillips and Thacker, Serial No. 325,632, filed March 23, 1940, Patent No. 2,264,056 granted November 25, 1941, and various other applications where like problems must be met.

Each of the inventions specifically mentioned has in common with the others that its operation depends upon the comparison of some characteristic of two radio signals other than their absolute amplitudes at the point of reception, and that the comparison may most conveniently be made by comparing the modulation components of the signals.

In the present specification my invention is shown as applied to the radio control device disclosed by Goble and Phillips in their application, Serial No. 314,854 above mentioned. Here the comparison is to be made between the direction of reception of two radio waves. This direction of reception, however, is reflected in the percentage of modulation of the two signals after these signals have been operated upon by the equipment, and the most feasible method of so comparing the signals is to mix them and to operate the indicating or control device by the resulting amplitude of the modulation component, this component shifting 180 degrees in phase as the direction of reception shifts to one side or the other of a null axis which is taken as zero azimuth.

Comparison by this simple method of mixing is effective only if the two modulated waves have the same amplitude, and since, in general, the amplitudes of the waves will be different at the point of reception, it follows that the signals generated by these waves should be amplified in inverse proportion to their intensity, so that the mean intensity of their radio frequency components at the point in the system where they are detected or de-modulated may be a constant which is independent of the strength of the received waves. In other words, what is required is an automatic volume control which will feed an absolutely uniform or flat input to the detector.

Furthermore, one of the characteristics of a device of the type mentioned is that the reference signal is that picked up on a loop antenna, which antennae have the characteristics that their receptivity is proportional to the sine of the angle between the axis of the loop and the direction from which the wave is received. This being the case, an automatic volume control which operated in inverse proportion to the signal fed to the receiver by the loop would be useless, since the tendency of the automatic volume control would be to suppress the very variation in signal intensity which the device utilizes as a measurement of angle.

In the aforementioned application a separate receiver was used for the sole purpose of actuating the automatic volume control. One of the objects of this invention is to reduce the complexity of the apparatus by incorporating the automatic volume control into the main amplifier which operates upon the signal to be measured. Other objects are to provide a simple type of automatic volume control which will so operate upon a signal as to amplify it in rigorously inverse proportion to its field intensity at the point of pickup; to provide a radio direction finder circuit of the right-and-left indicating type which will give a maximum modulation component for a given angle between the zero axis of the antenna system and the direction of reception of the wave; to provide a system which will operate over a maximum variation in intensity of the received wave, so as to give a direct comparison between the azimuth of immediately adjacent and far distant stations; to provide a system in accordance with the Goble and Phillips invention above mentioned employing a minimum number of antennae; and to provide a radio direction finder system wherein the reception characteristics may be made of substantially perfect cardioid pattern, giving a maximum of sensitivity.

Referring to the drawings:

Fig. 2 is a schematic diagram showing two such direction finders as applied to the radio control device of the Goble and Phillips application, Serial No. 314,854.

Figure 1:
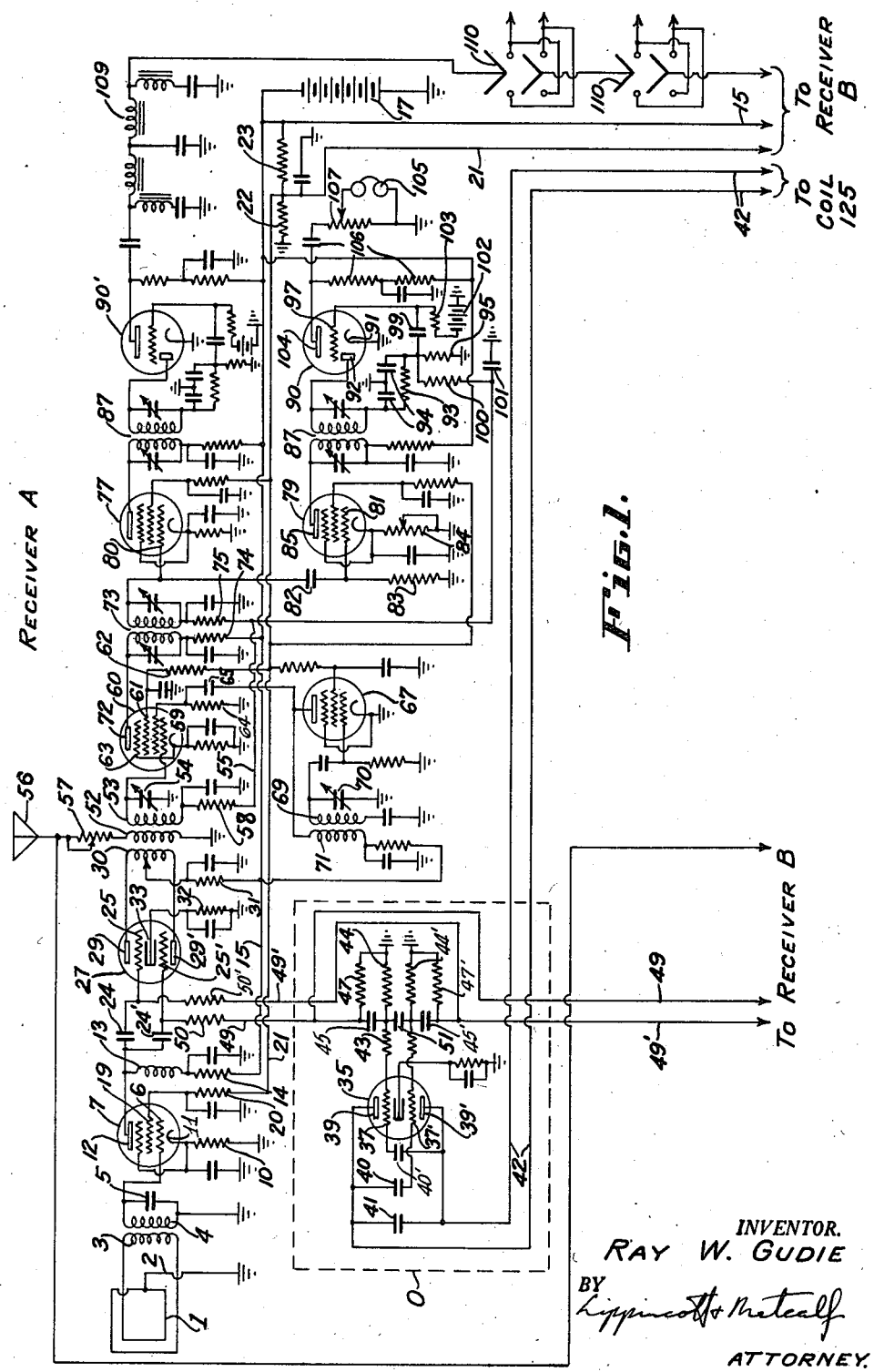
Fig. 1 is a schematic diagram of a radio direction finder embodying my invention.

Since this device comprises two substantially identical radio direction finders, plus certain equipment which is common to both, the duplicate devices are indicated in the drawings by the distinguishing characters A and B, and a single description will suffice for both. Like reference characters are applied to like parts of both receivers.

Each of the two radio direction finders comprises a loop antenna 1, the axis of which is the axis of reference for the direction of the received signals. The loop is provided with a grounded center tap 2, and across its two ends a coupling coil 3 is connected. This type of loop circuit makes it posible to balance the loop circuit accurately to ground, thus excluding all "vertical antenna component" from the signal delivered thereby, and giving it a reception characteristic of true sine-wave form, i. e., making the polar diagram of said characteristic accurately represent the theoretical "figure-eight" pattern.

The coupling coil 3 is the primary of a radio-frequency transformer, whose secondary coil 4 is tuned to the frequency of the received signal by means of a variable condenser 5. One end of the coil 4 is grounded. The other end connects to the control grid 6 of a radio-frequency amplifying tube, in this case a pentode 7.

In order to simplify the drawings, the conventional filament circuit of this tube, as well as those of the tubes later to be described, are omitted. Bias for the tube 7 is provided by a conventional cathode resistor 10 connected between ground and the separately heated cathode 11. The plate 12 is fed through an inductor 13 and a by-passed voltage regulating resistor 14 from a common plate bus 15 from which all tubes (except as particularly pointed hereinafter) are supplied. This bus 15 connects to the positive terminal of a suitable source 17, indicated as a battery, although a vibratory rectifier or a motor generator may be substituted. The screen grid 19 of the tube 7 connects through a resistor 20 to a screengrid bus 21, which is fed through a voltage divider comprising resistors 22 and 23 from the same source 17.

The plate end of the coil 13 connects through blocking condensers 24, 24' in parallel to the two grids 25, 25' of a double triode 27. The plates 29, 29' of the double triode 27 connect to opposite ends of a balanced coupling coil 30 having a center tap connecting through a by-passed resistor 31 to the plate bus 15. A by-passed cathode resistor 32 connects from the cathode 33 to ground.

In operation the grids 25, 25' are alternately swung negatively below cutoff by a suitable voltage wave, for example, such as is generated by the oscillator indicated by the general reference character O and comprising the equipment shown within the dotted outline indicated by this character. The single oscillator feeds both receivers A and B, and its primary requirement is that the waveform generated thereby should be symmetrical. The frequency developed by it is a matter of choice. It is preferred that it operate somewhere in the range between 100 and 200 cycles, but there is no theoretical limit to the frequency which may be used; it is merely convenience which places this frequency within the lower audio range.

In order to obtain the accurately symmetrical waveform desired I prefer to utilize a double triode 35 which has its two grids 37, 37' cross-connected to the two plates 39', 39 respectively through condensers 40, 40'. A similar condenser 41 connects the two plates, which are fed through leads 42 from the source 17 in a manner later to be described. The grid 37 connects through a resistor 43, which may have a value in the neighborhood of ¼ megohm, and connects through a second resistor 44, of the order of 40,000 ohms, to ground. A small condenser, (e. g., .01 microfarad) 45 connects from the junction of the resistors 43 and 44 to one end of a third resistor 47 of, say, 100,000 ohms resistance, the other end of which is also grounded. The ungrounded end of this resistor connects through a lead 49 and a series-resistor 50 with the grid 25'. An exactly similar network, whose elements are represented by the same reference characters distinguished by accent, connects from the grid 37' to ground and to the grid 25 of tube 27. A condenser 51 having a capacity of the order of .01 microfarad connects between the junctions of resistors 43 and 44 and resistors 43' and 44'.

It will be recognized that separate triodes could be substituted for the double triode 35, but the double triode is preferable because the two sets of elements are more likely to be exactly matched. It is also important that the values of the resistors and condensers in the oscillator network be exactly matched, but it is not important that they have the exact values here assigned to them, since changes in their values will merely vary the frequency of oscillation by varying the time constants of the resistive-capacitive circuits which they form. Increase in either resistance or capacitance will lower the frequency, while decrease in these values will raise it. The waveform generated by this oscillator is quite accurately sinusoidal; it is not necessary, however, that sine waves be used as long as symmetry of waveform is preserved. The present oscillator is used because with it it is easy to maintain such symmetry in practice.

It has already been stated that the wave generated by the oscillator O drives the grids of the tube 27 alternately below cutoff, so that while the oscillator O is in operation only one-half of the tube 27 is operating at any one time. The radio frequency applied to the two grids 25, 25' is the same, since the same circuit drives them in parallel. The same waves therefore appear in amplified form on the two plates 29, 29' alternately, and since these plates are connected to opposite ends of the coil 30, the two halves of this coil alternately carry the amplified signal. The coil 30 is coupled to an antenna coil 52 and a mixing coil 53, and the phase of the signal transferred to these two coils by the coupling is therefore reversed with the reversals of potential from the oscillator.

The antenna coil 52 connects between ground and an antenna 56 which is common to both receivers A and B, through a separate resistor 57 for each receiver. The antenna 55 may be a whip, or a horizontal wire antenna, but whatever the form taken it should be substantially without directional characteristics and should be effectively a vertical antenna if the device is to be used for direction finding with vertically polarized waves. The resistance 57 is used both to render the antenna aperiodic and to make the signal transferred from the antenna to the coil 52 equal to that similarly transferred from the coil 30. Perhaps a more accurate method of stating this would be to say that the signal transferred to the mixing coil 53 by the antenna should be equal to the value of the signals transferred to the same coil from the coil 30 from azimuths of 90 degrees and 270 degrees with respect to the axis of the loop 1. The optimum condition is that the vertical antenna effect from the antenna 56 should be equal to the maximum loop effect. The amplifier tubes 7 and 27 bring the level of the loop signal up to a point where it is comparable in intensity to the signal received from the vertical antenna, instead of being so small that the receptivity of a few inches of antenna may be enough to give a signal equal to the loop and the adjustment of the antenna may thus be so critical as to become almost impossible. If the antenna is connected as here shown the signals derived therefrom may be added to or subtracted from the component of signal from the loop, even though that component may be many times as great as the true loop effect current component. By properly adjusting the values of the resistor 57, and the number of turns in the coil 52, with respect to the loop signal as delivered to the coil 30, the current appearing in the mixing coil may be made proportional to $1 \pm \sin p$, where $p$ is the azimuth from which the signal is received on the loop, and the sign $\pm$ is dependent upon which of the two grids 25, 25' is operating below cutoff.

The signal appearing in the coil 53 will in any event be proportional to $A \pm \sin p$, where A may have any value, but the advantage of the present arrangement is that it permits making A accurately equal to 1, which gives a cardioid reception pattern and maximum sensitivity for any direction finder of the general type here under consideration.

It should be pointed out that while it is desirable that the vertical antenna signal from the coil 52 should equal the maximum loop signal, this is not a necessary condition but is merely an optimum one. For the device to function properly, however, the vertical antenna signal must be at least as great as the loop signal; i. e., the vertical antenna signal may be larger but must not be smaller than that from the loop. Furthermore, the ratio of vertical antenna signal to loop signal should be the same for both direction finder A and direction finder B in order to achieve maximum accuracy, and should bear very approximately the same ratio in any case.

The mixing coil 53 is tuned by a variable condenser 54, and its low potential end connects to an A. V. C. bus 55 through a by-passed retarding resistor 58. The mixed signals from the coil 53 are fed to the control grid 59 of a variable-mu first detector or frequency changer tube 60. This tube is shown as a hexode, having a screengrid 61 which derives its potential from the bus 21 through a resistor 62, and a modulator grid 63 which is connected to ground through a biasing resistor 64 and to a heterodyne oscillator through a coupling condenser 65. The heterodyne oscillator may be of any approved form; as shown it comprises a tetrode 67 having a grid coil 69 tuned by a variable condenser 70 and coupled to an untuned plate coil 71. The methods of applying the requisite potentials upon the various electrodes are conventional, hence are not described herein detail.

The plate 72 of the tube 60 connects to the primary of a tuned intermediate frequency transformer 73, the primary of which connects to the plate bus 15 through a by-passed resistor 74 while the secondary connects to the A. V. C. bus 55 through another by-passed resistor 75. The secondary feeds two variable-mu tubes 77 and 79 in parallel. The control grid 80 of tube 77 is fed directly, but the grid 81 of the tube 79 is fed through a blocking condenser 82, and is connected to ground through a grid leak 83.

Tube 79 feeds the automatic volume control. Being a variable-mu tube its amplification depends upon its grid bias, which is controllable through a variable cathode resistor 84. Its plate 85 feeds a tuned intermediate frequency transformer 87, the secondary of which feeds, in turn, a duplex diode-triode tube 90.

The tube 90 acts as a combined de-modulator or detector and amplifier. Its cathode 91 connects directly to ground. The diode-anode 92 is connected to one end of the secondary of the I. F. transformer 87, the other end of which connects to a resistance-capacity detector network. This network comprises first a resistor 93, across which are bridged a pair of condensers 94, connected in series with their center point grounded. The low tension end of this mesh connects to ground through a resistor 95 and also to the grid 97 of the triode portion of the tube through a coupling condenser 99. Still another resistor 100 connects from the junction of resistors 93 and 95 to the A. V. C. bus 55, which is grounded through a condenser 101. The grid 97 is biased by a battery 102 through a grid resistor 103 and the plate 104 of the triode portion of the tube 90 feeds an audio monitoring circuit including telephones or loud speaker 105 through a conventional resistance-capacity network 106.

As has been pointed out, the tube 77 is identical with the tube 79, and it feeds a tuned intermediate frequency transformer 87' and thence a duplex diode-triode detector 90' through circuit elements which are identical with those coupling the tubes 79 and 90 with the exception that the connection from the detector circuit to the A. V. C. bus is omitted.

The output circuit 106' of tube 90' is also identical with that of tube 90, but instead of feeding the potentiometer 107 and monitoring phones it feeds through a filter circuit 109 to a reversing switch 110 connecting the circuits where the signals from receivers A and B are combined, as will be hereinafter described. Before so describing them, however, we will consider the operation of the A. V. C. circuit.

It has been shown that the signal delivered to the first detector and modulator tube 60 comprises a component delivered from the vertical antenna 56 plus an amplified component from the loop 1, that the loop component is never greater than the vertical antenna component, and that the loop component is alternately added to and subtracted from the vertical antenna component with a periodicity determined by the oscillator O. Since the wave from the oscillator O is symmetrical the increase in amplitude of the combined components during the period when they are additive is equal in time and in amount to the decrease in amplitude during the half cycle when the two are subtractive; i. e., when integrated over any number of complete cycles the average intensity of the radio-frequency signal fed to the modulator tube 60 is a constant depending purely upon the receptivity of the vertical antenna and the intensity of the received wave. This would not hold true if the loop component were ever permitted to become greater than the vertical antenna component, for if this occurred the result would be over-modulation, and a double frequency modulation component would appear in the mixed signal. Under the specified conditions, however, the average signal is unaffected by the percentage to which it is modulated, and the degree of modulation will be equal to $$\frac{\sin P}{A}$$

as these quantities have heretofore been defined.

The signal delivered by the frequency converter tube 60 is equal to the product of the signal fed to it from the mixing coil 53 times the intensity of the heterodyne oscillation from the tube 67, multiplied by the amplification factor of the tube 60. The heterodyning oscillation may readily be kept substantially constant, but if not it is of no particular importance, since its amplitude appears as a product in the output of the tube and the effect of a change in amplitude of the oscillator has the same effect as a change in the intensity of the received wave, although under ordinary conditions the percentage change due to change in oscillator amplitude will be much smaller than that due to change in received wave intensity. The amplified intermediate frequency wave is then fed to tube 79, which has a nearly constant amplification factor under ordinary conditions, i. e., when its amplification has once been set by means of the cathode bias resistor 84.

The diode comprising cathode 91 and anode 92 of the tube 90 therefore operates upon and rectifies a signal which is directly proportional to the signal fed to tube 79 times its amplification factor, and the current which the diode permits to flow therethrough is proportional to the positive halves of the waves, such diode detectors being linear in characteristics. The intermediate frequency component of this current is filtered out and grounded in the network comprising resistor 93 and condensers 94, and the potential applied across resistor 95, and consequently the current flowing therethrough, are therefore proportional to the envelope amplitude of the signal delivered from tube 79; i. e., this potential and current have a D.-C. component plus a modulation component which again are proportional to $A \pm \sin p$. The same potential appears across the resistor 100, and through this resistor it charges the condenser 101. The time constant of this resistor-condenser combination being greatly in excess of the period of the modulation component, the mean potential appearing across condenser 101 to ground is directly proportional to the average intensity of the signal delivered by the tube 79; i. e., it is directly proportional to the carrier or unmodulated component of the intermediate frequency wave.

This average potential across condenser 101 is applied to the A. V. C. bus and, further filtered by resistors 58 and 78 and their respective by-pass condensers, appears upon the control grids of tubes 60 and 77 respectively. Both of these are variable-mu tubes, and the effect of an increased amplitude delivered by tube 60 is therefore to increase the negative bias upon this tube and hence tends to cut down its output. Obviously, however, it cannot maintain the output of tube 60 constant, since an increased output is necessary in order to increase the negative bias. The effect, so far as this tube is concerned, is therefore simply to reduce the effect of changes in received signal intensity, as is the case in the ordinary A. V. C., and not to eliminate them entirely.

The same change in bias, however, which is effective on tube 60 is also effective on tube 77, and tube 77 has a characteristic curve of the same shape as that of tube 79. In the tubes best adapted for the present purpose, for example, the tubes known in the trade as "6SK7," the shape of the grid-plate curve is logarithmic or substantially so, that is to say, the slope of the curve relating plate current to grid voltage in the tube is proportional to the plate current.

Mathematically, the $E_g$–$I_p$ characteristic of the tube may be expressed by the equation $I_p = K e^{M E_g}$, where K and M are constants and $e$ is the Napierian base.

When a sine wave signal of amplitude E is applied to the grid of such a tube, the output signal current $I_s$ has an amplitude which is proportional to $$\frac{e^{M(B+E)} - e^{M(B-E)}}{2}$$

where B is the grid bias voltage. Simplifying, this may be expressed:

$$I_s = K' e^{MB} \left( e^{ME} - \frac{1}{e^{ME}} \right)$$

K' being a constant which takes into account the constant K previously introduced, the form factor of the output wave, and the factor 2 in the denominator of the expression first given.

A number of things may be learned from the form of the expression. One of these is that the quantity in parentheses is a constant for any given value of signal, irrespective of the grid bias, and therefore if the same signal be fed to two such tubes as that under consideration the outputs of those tubes will bear a constant ratio, irrespective of signal amplitude. Another thing shown by the equation is that the amplification factor is a function of the amplitude of the input signal, as well as of the bias voltage, and that if the bias be fixed the amplification will increase with signal amplitude. Furthermore, the increase of plate current when the grid swings positive is greater than the decrease when the grid swings negative, and hence the mean plate current will increase, when a signal is received, to a degree which depends on the signal amplitude, and that therefore the bias on a self biased tube will increase with increased signal, thus tending to compensate in part for the increase in amplification with amplitude. Finally, the equation shows that if the output signal current $I_s$ is to be a constant, $$e^{ME} - \frac{1}{e^{ME}}$$

must equal $$\frac{1}{e^{MB}}$$

Analytical proof that this relation obtains with the connections here shown is difficult if not impossible, for the equations become complex and difficult to interpret, and by inspection would lead one to expect a quite different result. It is easy to see that as regards tube 77 the quantity $e^{MB}$ will be a fraction, as the bias applied thereto by the output of the tube 79 is negative, B is therefore a negative quantity —B', and $$e^{-MB'} = \frac{1}{e^{MB}}$$

But the bias voltage B is itself an exponential quantity, proportional to $$RK' \left( e^{MB} - \frac{1}{e^{ME}} \right)$$

where R is the resistance of the resistor 95, and the factor of proportionality is not a constant.

as the tube 79 is self-biased, and its amplification factor varies with amplitude, as has been shown above.

In practice, however, the necessary relationship obtains if certain precautions be observed. Only a moderate proportion of the possible maximum output signal of tube 77 should be used— less than half in any event and one-third or even less is preferable. The proportion of the curve used will decrease as the bias applied thereto by tube 79 increases. The latter tube should be so self-biased as not to overload on strong signals. The quantities involved are not critical, and using the "6SK7" amplifier and a "6SQ7" detector, proper results can be obtained if the A. V. C. resistor 95 be given a value of 500,000 ohms and the variable cathode resistor 84 a maximum value of 10,000 ohms.

Using these values, a receiver of this type has given a sensibly constant output between signal strengths of 100 and 80,000 microvolts per meter.

It is obviously possible to make the amplification of tube 79 so great that output decreases with increased input, but if adjustment be made in the laboratory, by means of the cathode resistor 84, until a very strong input signal gives the same reading as a minimum signal of about 100 MV/M, the desired results will be obtained.

By the method thus described it has been found possible to maintain the output so nearly constant that it has been impossible to detect any difference in signal strength between a weak station in San Diego and a powerful station in Los Angeles, when a plane in which the system was installed was immediately above the powerful station.

It will be seen that as far as the linearity of output is concerned within the operating range of the device it is unimportant whether or not the A. V. C. voltage be applied to the frequency changer tube 60, but that so applying it increases greatly the range of operation.

Returning now to the description of the apparatus, each of the receivers A and B feeds one of two balanced primaries 111, 111' of a transformer 112 whose center tapped secondary 113 feeds, in push-pull, the grids of a double triode 114. The signal fed to this tube is the resultant of the two modulating components from the two receivers A and B. These components both being derived from the oscillator O ar either exactly in phase or 180 degrees out of phase, depending upon the azimuth of the received signal and the settings of the reversing switches 110. These signals may, therefore, be cumulative, may balance out entirely, or may have a finite resultant which is less than the greater of the two signals taken alone and whose phase depends upon which signal is preponderant. This resultant signal is fed through a second push-pull transformer 115 and a double triode amplifier 117 to an output transformer having a push-pull primary 119 and a single secondary 120 which feeds the grids of two output tubes 121, 121' in parallel. These tubes may be either of the high vacuum or the grid-glow type, and in their output circuits are connected relay coils 122, 122', whose operation is the primary purpose of the entire device. Each of these coils is shunted by a condenser 123, whose purpose is to flatten out the modulating component.

The plate circuits of the tubes 121, 121' are supplied with alternating current derived from the oscillator O. The two plates 39, 39' of the oscillator tube 35 are connected through the lead 42 to the two ends of a primary coil 125. A center tap 127 on this coil is connected to the source 17 to supply the plate voltage for the tube 35. A push-pull secondary 129, coupled to the primary 125, feeds a pair of power amplifier tubes 130, 130', which in turn feed a transformer 131, and the two ends of the secondary 132 of this transformer connect through the relays 122, 122' to the tubes 121, 121' respectively.

It will be seen that by this arrangement the plates of the two tubes 121, 121' are fed with alternating current of the same frequency as that fed to the grids of the two tubes, and that the plate voltage will be in phase with the grid voltage on one of these tubes and out of phase with the grid voltage of the other, depending upon the phase of the resultant current from the two receivers. The grids of the two tubes 121, 121' therefore swing in potential together. When both grids are negative neither tube will carry current. When both are positive the plate of one tube is positive and that of the other negative, and only that tube whose plate is positive will carry current. One and one only of the relays 122, 122' will therefore operate, and which one does this is dependent upon the phase of the mixed signal delivered by the transformer 112.

With the relays 122, 122' connected to control the operation of an airplane, the course of the airplane will therefore depend upon the setting of the switches 110, but will be independent of the proximity of the controlling station.

Since the system under discussion is designed to hold an airplane upon a direct course fixed by the line between two controlling stations, irrespective of cross winds, and since this requires that the plane head into the cross winds in order to maintain its true course, this independence of signal strength is very important. In a system wherein a single station only is used for guidance the absolute value of the modulation component of a direction finder is unimportant, since both right and left indications are derived from the same source and are therefore of equal intensity at any moment, and will always balance out when the plane is on course. Where, however, a finite signal derived from one source is balanced against a finite signal from another, the relative magnitude of the two modulation components becomes as important as their phase. Tests of the present system have proved that its control of volume or amplitude is sufficient to yield the desired result to an even greater degree than might be expected, for on a recent series of flights on the Los Angeles-San Diego course above mentioned, covering an air-line distance of well over a hundred miles, the maximum deviation from a fixed point of reference along the course was less than fifty feet in a series of two flights in each direction. It is obvious, that in a test such as this the plane is subjected to cross winds from opposite sides as it traverses the course in the opposite directions, and, further, that the "toe and heel" guiding stations are interchanged. Since a constant wind blows from the Pacific obliquely across this course such a result indicates practically perfect operation.

I claim:

1. A radio direction finder system comprising an antenna system including a directional receiving element having a null reception axis fixed in azimuth, and a non-directional receiving element, providing respective directional and non-directional signal components, and having a receptivity with respect to radio signals from various azimuths substantially proportional to A± sin $p$, where A is not less than one, and $p$ is the angle between the null reception axis of said directional receiving element and the direction from which the radio wave is received, means for periodically reversing the phase of one component of such signals with respect to the other, to modulate such signals to a percentage represented by the absolute value of $$\frac{\sin p}{A}$$

a pair of variable-mu amplifier tubes having grids connected in parallel for actuation by the modulated signals, a separate detector fed by each of said amplifier tubes, means for applying a bias to the gride of one of said amplifier tubes which is proportional to the mean output current of the detector fed by the second of said amplifier tubes and self-biasing means for the grid of said second amplifier tube, whereby the mean intensity of the signal fed to the detector of said first amplifier tube remains substantially a constant while its modulation percentage varies with the azimuth of the received signal.

2. A radio direction finder system comprising an antenna system including a directional receiving element having a null reception axis fixed in azimuth, and a non-directional receiving element, providing respective directional and non-directional signal components, and having a receptivity with respect to radio signals from various azimuths substantially proportional to A± sin $p$, where A is not less than one, and $p$ is the angle between the null reception axis of said directional receiving element and the direction from which the radio wave is received, means for periodically reversing the phase of one component of such signals with respect to the other, to modulate such signals to a percentage represented by the absolute value of $$\frac{\sin p}{A}$$

a pair of variable-mu amplifier tubes having grids connected in parallel for actuation by the modulated signals, a separate detector fed by each of said amplifier tubes, means for applying a bias to the grid of one of said amplifier tubes which is proportional to the mean output current of the detector fed by the second of said amplifier tubes, means for biasing the grid of said second amplifier tube to control the amplification thereof, and means for varying said last mentioned bias to so control the amplification of said first mentioned tube as to render it inversely proportional to the amplitude of the signal fed to both tubes.

3. A radio direction finder comprising an antenna system including means for producing from a received signal a reception component independent of the direction of reception and a component varying with the direction of reception with respect to said system, said independent component being at least as great as the maximum value of said varying component, means for periodically reversing one of said components with respect to the other, an amplifier coupled to operate on both of said components, said amplifier comprising a pair of vacuum tubes each having a logarithmic grid-plate characteristic and having control grids connected in parallel, means for varying the grid bias of one of said tubes to vary the amplification factor thereof, means for rectifying the A. C. output of said last mentioned tube, means for integrating said rectified output, means for applying the potential of said integrated output to bias the control grid of the other of said tubes to maintain constant the A. C. output thereof irrespective of the intensity of the input signal thereto, a detector connected to respond to the output of said second mentioned tube, and a work circuit fed by said detector.

4. A radio direction finder comprising an antenna system including means for producing from a received signal a reception component independent of the direction of reception and a component varying with the direction of reception with respect to said system, said independent component being at least as great as the maximum value of said varying component, means for periodically reversing one of said components with respect to the other, a heterodyne frequency changer operatively connected to said antenna system, an intermediate frequency amplifier fed by said frequency changer, said amplifier comprising a pair of vacuum tubes each having a logarithmic grid-plate characteristic and having control grids connected in parallel, means for varying the grid bias of one of said tubes to vary the amplification factor thereof, means for rectifying the A. C. output of said last mentioned tube, means for integrating said rectified output, means for applying the potential of said integrated output to bias the control grid of the other of said tubes to maintain constant the A. C. output thereof irrespective of the intensity of the input signal thereto, a detector connected to respond to the output of said second mentioned tube, and a work circuit fed by said detector.

RAY W. GUDIE.